(12) United States Patent
Tomofuji (10) Patent No.: US 8,982,380 B2
(45) Date of Patent: Mar. 17, 2015

(54) POWER SUPPLY APPARATUS AND IMAGE FORMING APPARATUS INCLUDING THE SAME

(71) Applicant: KYOCERA Document Solutions Inc., Osaka-shi, Osaka (JP)

(72) Inventor: Shinji Tomofuji, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/137,113

(22) Filed: Dec. 20, 2013

(65) Prior Publication Data

US 2014/0176986 A1    Jun. 26, 2014

(30) Foreign Application Priority Data

Dec. 26, 2012  (JP) ................................. 2012-282282

(51) Int. Cl.
| | |
|---|---|
| *G06F 15/00* | (2006.01) |
| *G06F 1/00* | (2006.01) |
| *G06K 15/00* | (2006.01) |
| *H04N 1/00* | (2006.01) |

(52) U.S. Cl.
CPC ....... *H04N 1/00896* (2013.01); *H04N 1/00899* (2013.01); *H04N 1/00904* (2013.01); *Y02B 60/1271* (2013.01)
USPC .......................................... 358/1.14; 358/1.1

(58) Field of Classification Search
CPC .......... H04N 1/00896; H04N 1/00899; H04N 1/00904; Y02B 60/1271
USPC ................................ 358/1.1, 1.15, 1.14, 1.13
See application file for complete search history.

(56) References Cited

U.S. PATENT DOCUMENTS

| | | | |
|---|---|---|---|
| 2007/0286630 A1 | 12/2007 | Watanabe et al. | |
| 2012/0030491 A1* | 2/2012 | Itou | ............................... 713/323 |
| 2012/0155910 A1* | 6/2012 | Sato | ............................... 399/88 |

FOREIGN PATENT DOCUMENTS

JP          2007334304 A       12/2007

* cited by examiner

*Primary Examiner* — Douglas Tran
(74) *Attorney, Agent, or Firm* — Alleman Hall McCoy Russell & Tuttle LLP (57) ABSTRACT

A power supply apparatus switches between normal operation mode and power saving mode, to supply power to the loads. Power supply apparatus includes first power supply, second power supply, current detection portion, determination portion, and supply control portion. First power supply is configured to supply power to plurality of loads. Second power supply has an output current capacity which is less than that of first power supply. Current detection portion is configured to detect current consumption of first load that is operating. Determination portion is configured to determine whether or not the current consumption detected by current detection portion is less than or equal to the output current capacity of second power supply. Supply control portion is configured to supply, based on a result of determination made by determination portion, power to the first load from one of first power supply and second power supply in the power saving mode.

10 Claims, 8 Drawing Sheets

POWER SUPPLY APPARATUS AND IMAGE FORMING APPARATUS INCLUDING THE SAME

INCORPORATION BY REFERENCE

This application is based upon and claims the benefit of priority from the corresponding Japanese Patent Application No. 2012-282282 filed on Dec. 26, 2012, the entire contents of which are incorporated herein by reference.

BACKGROUND

The present disclosure relates to power supply apparatuses that switch between a normal operation mode in which electric power is supplied to a plurality of loads including a first load, and a power saving mode in which electric power is supplied to a part of the loads including at least the first load, to supply electric power to the loads, and image forming apparatuses including the power supply apparatuses.

Image forming apparatuses, such as copy machines, printers, and facsimile apparatuses, operate in one of a normal operation mode and a power saving mode (also referred to as a sleep mode). The normal operation mode represents an operation mode in which the image forming apparatus is on standby so as to operate immediately when a print instruction is inputted. The power saving mode represents an operation mode in which the image forming apparatus is on standby so as to reduce power consumption of the apparatus by supplying power to a part of components. For example, in a case where a standby time period from power-on to input of a print instruction is shorter than or equal to a predetermined time period, the image forming apparatus operates in the normal operation mode. The image forming apparatus is controlled so as to shift from the normal operation mode to the power saving mode after elapse of the predetermined time period, in a case where the standby time period is longer than the predetermined time period. To date, image forming apparatuses have been known which halt, in the power saving mode, supply of power to controlled portions other than a main control portion, and also halt, when the standby state is further prolonged, supply of power to the main control portion, to enhance a power saving effect.

A power supply device for use in this type of image forming apparatus includes a power converter such as a DC/DC converter. The power converter converts commercial electric power supplied from the outside, to power suited for drive portions in the image forming apparatus, to supply the power to each drive portion. Specifically, AC100V commercial electric power is converted to DC power, and the voltage is increased or reduced to a voltage suited for each drive portion, to supply the power to each drive portion. However, in general, the conversion efficiency of the power converter is such that the higher the conversion efficiency is, the higher a ratio of a load current to an output current capacity of the power converter is, and the lower the conversion efficiency is, the less the ratio is. Therefore, in a case where power is supplied from a common power converter in each of operations of the normal operation mode and the power saving mode, since current consumption is low in the power saving mode, the ratio described above is extremely reduced. As a result, the conversion efficiency of the power converter becomes extremely low, and power saving effect may not be sufficient. Therefore, in conventional image forming apparatuses, a high-capacity power converter having a relatively high capacity, and a low-capacity power converter are separately provided, and power is supplied to each load from the high-capacity power converter in the normal operation mode, and power is supplied only to a part of the loads from the low-capacity power converter in the power saving mode.

In a case where the image forming apparatus receives a print instruction from the outside in the power saving mode, the image forming apparatus needs to shift to the normal operation mode. Therefore, power is supplied to an interface portion so as to receive the print instruction also in the power saving mode. Accordingly, an output current capacity of the low-capacity power converter used in the power saving mode is set based on a load current of the interface portion. In this case, the output current capacity of the low-capacity power converter is set so as to increase a rate of the load current of the interface portion, whereby conversion efficiency of the low-capacity power converter can be enhanced and power saving effect can be enhanced.

However, the load current varies among the interface portions. Therefore, when the output current capacity of the power converter is set in consideration of the variation, a ratio of the load current of the interface portion to the output current capacity may not be maximized, and high power-saving effect cannot be obtained. Further, an interface portion having a load current that is greatly higher than other interface portions may be incorporated in the image forming apparatus in some cases. When the output current capacity of the power converter is set in consideration of such a case, a ratio of the load current of the interface portion to the output current capacity is inevitably reduced. Consequently, in this case, the low-capacity power converter as described above cannot be used with an enhanced conversion efficiency, and power saving effect is insufficient. Further, various types of highly-functional electronic devices, for use in the image forming apparatuses, having high-degree of compatibility are distributed, and, for example, the interface portion of the image forming apparatus may be replaced with another compatible interface portion. In this case, in a case where a load current of the interface portion that has replaced the previous interface portion is higher than a load current of the previous interface portion, the load current of the interface portion may exceed the capacity of the power converter. Thus, the interface portion may malfunction or the power converter may be damaged. Such a problem may arise not only in the interface portion, but also in devices to which power is supplied when the image forming apparatus is in the power saving mode.

SUMMARY

A power supply apparatus according to one aspect of the present disclosure switches between a normal operation mode in which power is supplied to a plurality of loads including a first load and a power saving mode in which power is supplied to a part of the loads including at least the first load, to supply power to the loads. The power supply apparatus includes a first power supply, a second power supply, a current detection portion, a determination portion, and a supply control portion. The first power supply is configured to supply power to the plurality of loads. The second power supply has an output current capacity which is less than that of the first power supply. The current detection portion is configured to detect current consumption of the first load that is operating. The determination portion is configured to determine whether or not the current consumption detected by the current detection portion is less than or equal to the output current capacity of the second power supply. The supply control portion is configured to supply, based on a result of determination made by the determination portion, power to the first load from one of the first power supply and the second power supply in the power saving mode.

An image forming apparatus according to another aspect of the present disclosure includes a power supply apparatus, an image forming portion, and an input reception portion. The power supply apparatus is configured to switch between a normal operation mode in which power is supplied to a plurality of loads including a first load and a power saving mode in which power is supplied to a part of the loads including at least the first load, to supply power to the loads. The image forming portion is provided as one of the loads other than the first load and is configured to perform image formation on a recording medium. The input reception portion is provided as the first load and is configured to receive input of a signal representing a print instruction issued to the image forming portion. The power supply apparatus includes a first power supply, a second power supply, a current detection portion, a determination portion, and a supply control portion. The first power supply is configured to supply power to the plurality of loads. The second power supply has an output current capacity which is less than that of the first power supply. The current detection portion is configured to detect current consumption of the first load that is operating. The determination portion is configured to determine whether or not the current consumption detected by the current detection portion is less than or equal to the output current capacity of the second power supply. The supply control portion is configured to supply, based on a result of determination made by the determination portion, power to the first load from one of the first power supply and the second power supply in the power saving mode.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the drawings as appropriate. The embodiment described below represents an exemplary implementation of the present disclosure, and the technical scope of the present disclosure is not limited by the embodiment described below.

Schematic Structure of Multifunction Peripheral X

Firstly, with reference to FIG. 1 and FIG. 2, schematic structures of a power supply apparatus 60 (an example of a power supply apparatus of the present disclosure) and a multifunction peripheral X (an example of an image forming apparatus of the present disclosure) including the power supply apparatus 60, according to an embodiment of the present disclosure, will be described.

Figure 1:
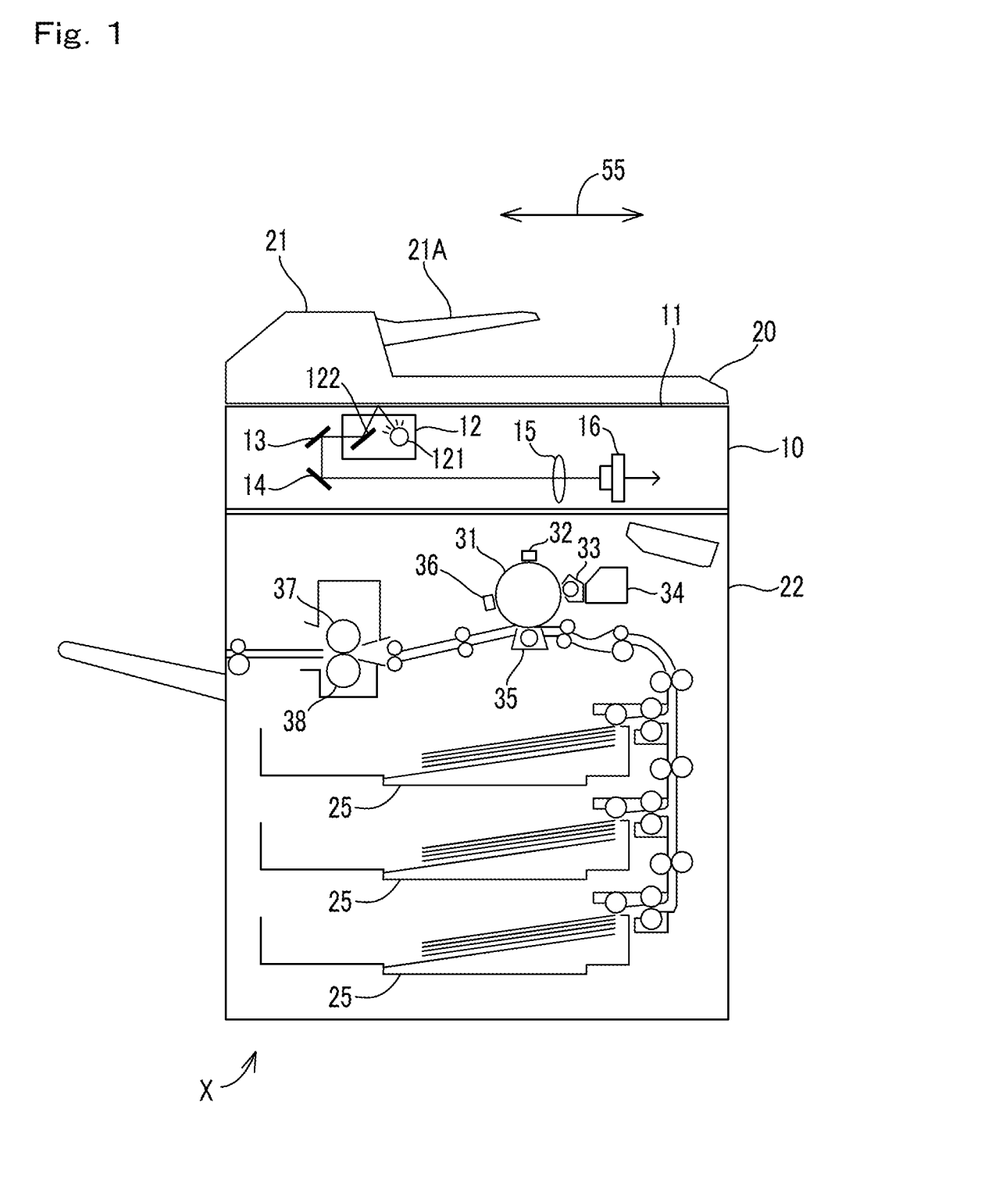
FIG. 1 schematically illustrates an outline of a structure of a multifunction peripheral according to an embodiment of the present disclosure.
Figure 2:
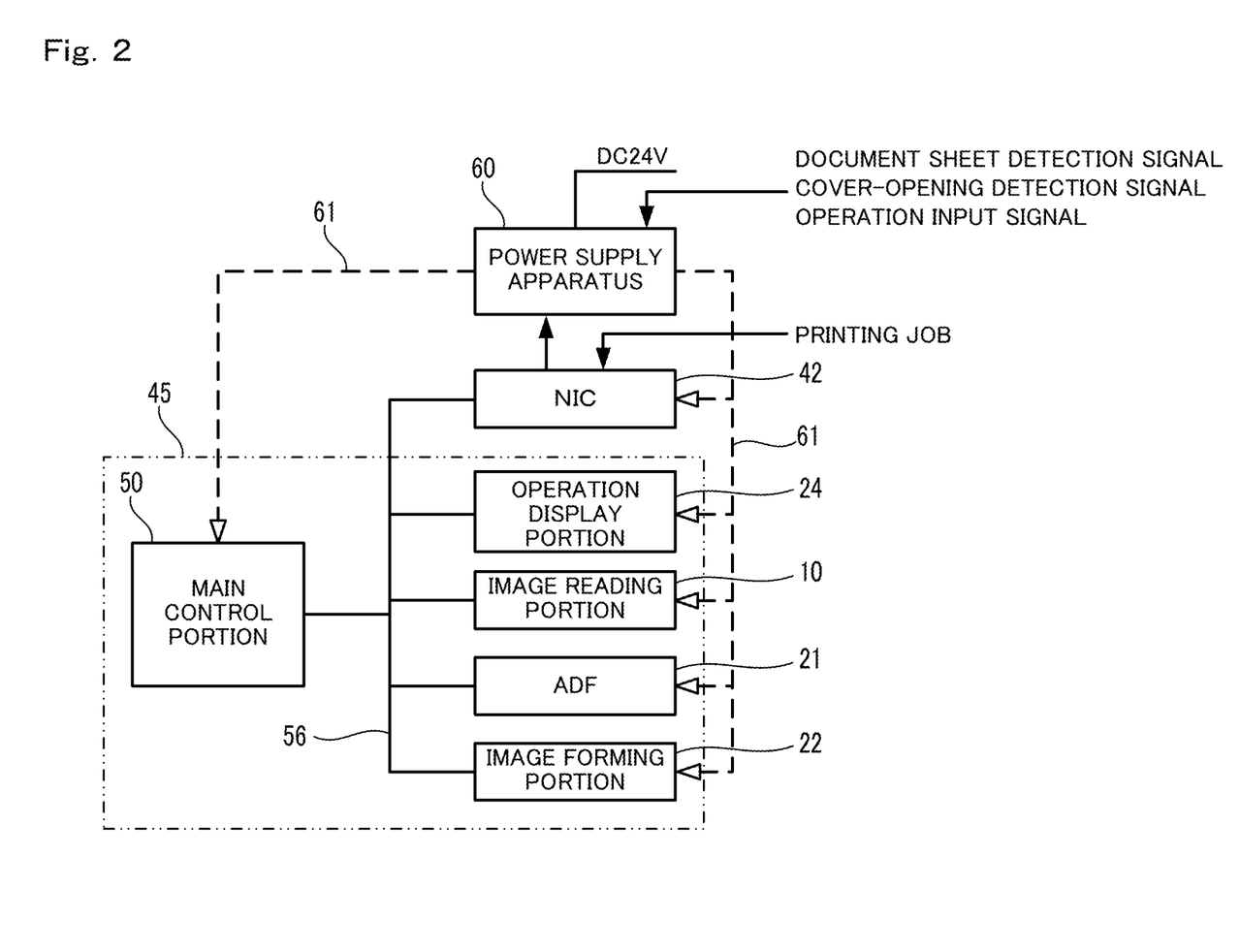
FIG. 2 is a block diagram schematically illustrating a structure of the multifunction peripheral shown in FIG. 1.

As shown in FIG. 1 and FIG. 2, the multifunction peripheral X includes an image reading portion 10, a document sheet cover 20, an ADF (automatic document feeder) 21, an image forming portion 22 (an example of an image forming portion of the present disclosure), an operation display portion 24 (see FIG. 2), sheet feed cassettes 25, an NIC (network interface card) 42 (see FIG. 2), and a main control portion 50 (see FIG. 2) that controls those components. Further, the multifunction peripheral X includes the power supply apparatus 60 that supplies required power to the image reading portion 10, the image forming portion 22, the operation display portion 24, the NIC 42, the main control portion 50, and the like. The NIC 42 is an example of a first load and input reception portion of the present disclosure. Further, the components other than the NIC 42, specifically, the main control portion 50, the image reading portion 10, the ADF 21, the image forming portion 22, and the like are examples of loads other than the first load according to the present disclosure. In the present embodiment, the multifunction peripheral X is illustrated as an example of the image forming apparatus of the present disclosure. However, the image forming apparatus is not limited thereto. The image forming apparatus of the present disclosure may be, for example, a printer, a facsimile apparatus, or a copy machine.

The image reading portion 10 executes an image reading process for reading image data from a document sheet. As shown in FIG. 1, the image reading portion 10 includes a contact glass 11, a reading unit 12, mirrors 13 and 14, an optical lens 15, a CCD 16, and the like.

The reading unit 12 includes a LED light source 121 and a mirror 122, and is movable in a secondary scanning direction 55 (the right-left direction in FIG. 1) by a not-illustrated moving mechanism using a driving motor such as a stepping motor. When the reading unit 12 is moved in the secondary scanning direction 55 by the driving motor, scanning in the secondary scanning direction 55 is performed with light applied from the LED light source 121 to the contact glass 11 provided on the top surface of the image reading portion 10.

When light is applied from the LED light source 121, the mirror 122 reflects, toward the mirror 13, light reflected by a document sheet or a reverse surface of the document sheet cover 20. The light reflected by the mirror 122 is guided to the optical lens 15 through the mirrors 13 and 14. The optical lens 15 focuses the incident light on the CCD 16.

The CCD 16 is a photoelectric converter that converts the received light to an electric signal (voltage) according to an amount of the received light (intensity of brightness), to output the electric signal to the main control portion 50. The main control portion 50 generates image data of the document sheet by subjecting the electric signal from the CCD 16 to image processing. In the present embodiment, an exemplary case where the CCD 16 is used as an imaging device is described. However, instead of the reading mechanism using the CCD 16, a reading mechanism that includes a contact image sensor (CIS) having a focal length shorter than the CCD 16 may be used.

To the image reading portion 10, the document sheet cover 20 is pivotably mounted. By the document sheet cover 20 being operated to pivot, the contact glass 11 on the top surface of the image reading portion 10 is opened or closed. In a pivoting support portion of the document sheet cover 20, a cover-opening detection sensor (not shown) such as a limit switch is provided. When a user opens the document sheet cover 20 such that an image of a document sheet is read, the cover-opening detection sensor is actuated to output a detection signal (cover-opening detection signal) to a power supply control portion 62 of the power supply apparatus 60 (see FIG. 2).

The image reading portion 10 reads an image of a document sheet in the following procedure. Firstly, the document sheet is placed on the contact glass 11, and the document sheet cover 20 is then caused to be in a closed position. Thereafter, when an image reading instruction is inputted through the operation display portion 24, one line of light is sequentially applied continuously from the LED light source 121 while the reading unit 12 is being moved rightward in the secondary scanning direction 55. Light reflected by the document sheet or the reverse surface of the document sheet cover 20 is guided to the CCD 16 through the mirrors 122, 13, and 14, and the optical lens 15, and light amount data based on an amount of light received by the CCD 16 is sequentially outputted to the main control portion 50. When light amount data for the entirety of the region to which light has been applied is obtained, the main control portion 50 processes the light amount data, to generate image data of the document sheet based on the light amount data.

The ADF 21 is provided in the document sheet cover 20. The ADF 21 sequentially conveys one or more document sheets set on a document sheet set portion 21A, by means of a plurality of conveying rollers, and moves the document sheets rightward in the secondary scanning direction 55 through an automatic document sheet reading position defined on the contact glass 11. When the document sheet is moved by the ADF 21, the reading unit 12 is positioned below the automatic document sheet reading position, and an image of the document sheet being moved is read by the reading unit 12 at this position. A mechanical document sheet detection sensor (not shown) that can output a contact signal is provided in the document sheet set portion 21A. When a document sheet is set on the document sheet set portion 21A, the document sheet detection sensor is actuated to output a detection signal (document sheet detection signal) to the power supply control portion 62 of the power supply apparatus 60 (see FIG. 2).

As shown in FIG. 1, the image forming portion 22 executes an image forming process (printing process) by electrophotography according to image data read by the image reading portion 10 or a printing job inputted through the NIC 42 from an external information processing apparatus such as a personal computer. Specifically, the image forming portion 22 includes a photosensitive drum 31, a charging device 32, a developing device 33, a toner container 34, a transfer roller 35, an electricity removing device 36, a fixing roller 37, a pressure roller 38, and the like. In the present embodiment, the image forming portion 22 using electrophotography, is illustrated. However, the image forming portion 22 is not limited to an image forming portion using electrophotography, and may be an image forming portion using an inkjet recording mode, or an image forming portion using another recording mode or printing mode.

In the image forming portion 22, an image forming process on a print sheet fed by the sheet feed cassette 25 is performed in the following procedure. Firstly, when a printing job including a print instruction is inputted through the NIC 42, the photosensitive drum 31 is uniformly charged at a predetermined potential by the charging device 32. Subsequently, light based on image data included in the printing job is applied to the surface of the photosensitive drum 31 by a not-illustrated laser scanner unit (LSU). Thus, an electrostatic latent image is formed on the surface of the photosensitive drum 31. The electrostatic latent image on the photosensitive drum 31 is developed (visualized) into a toner image by the developing device 33. Toner (developer) is additionally supplied to the developing device 33 from the toner container 34. Subsequently, the toner image formed on the photosensitive drum 31 is transferred to the print sheet by the transfer roller 35. Thereafter, the toner image having been transferred to the print sheet is heated and fused by the fixing roller 37, to be fixed onto the print sheet, when the print sheet passes between the fixing roller 37 and the pressure roller 38 and is discharged. Potential of the photosensitive drum 31 is removed by the electricity removing device 36.

The operation display portion 24 includes various operation keys, a liquid crystal display, and the like. As the operation key, for example, a start button through which an instruction for starting reading of a document sheet is inputted, a stop button for stopping a reading operation, a numerical keypad, a cross keypad, and the like are arranged. In the multifunction peripheral X, the image reading process or the image forming process is executed according to various operation instructions inputted through the operation display portion 24. When a user operates the operation key for execution of the image reading operation or the image forming operation, a contact signal of the operation key is outputted as an operation input signal from the operation display portion 24 to the power supply control portion 62 of the power supply apparatus 60 (see FIG. 2).

The NIC 42 is a communication interface card that operates to receive input of a printing job from an external information processing apparatus via, for example, a network such as the Internet and an LAN which complies with the IEEE802.3 standard. Specifically, the NIC 42 is an exemplary expansion card that is inserted into a not-illustrated expansion slot formed in the multifunction peripheral X when used. In the NIC 42, an electronic circuit for communicating over a network such as an LAN and the Internet is mounted. The NIC 42 is detachably mounted in the expansion slot. When the NIC 42 is mounted in the expansion slot, a network communication function is additionally provided in the multifunction peripheral X. When the NIC 42 receives a printing job via, for example, a wired or wireless data transmission medium from the information processing apparatus, the NIC 42 outputs a reception signal representing the reception, to the power supply control portion 62 of the power supply apparatus 60.

In the expansion slot, not only the NIC 42, but also another compatible NIC that can be mounted therein and has the same function as the NIC 42, may be mounted.

The main control portion 50 controls an operation of the multifunction peripheral X. The main control portion 50 is structured as a control board in which a microcomputer including, as main components, a CPU, a ROM, a RAM, and an EEPROM is mounted. Further, to the main control portion 50, not-illustrated control devices such as a motor driver and a liquid crystal display controller are also mounted. As shown in FIG. 2, to the main control portion 50, the image reading portion 10, the image forming portion 22, the operation display portion 24, a driving motor 41, the NIC 42, and the like are electrically connected via an internal bus 56. The internal bus 56 includes an address bus, a data bus, and a control signal line. The main control portion 50 comprehensively controls the multifunction peripheral X by a predetermined control program stored in the ROM being executed by the CPU. The main control portion 50 may be structured as an electronic circuit such as an integrated circuit (ASIC, DSP).

The power supply apparatus 60 supplies power required by the components, of the multifunction peripheral X, such as the main control portion 50, the image reading portion 10, the ADF 21, the image forming portion 22, the operation display portion 24, and the NIC 42. As shown in FIG. 2, the power supply apparatus 60 is connected to the main control portion 50, the image reading portion 10, the ADF 21, the image forming portion 22, the operation display portion 24, and the NIC 42 via a power supply cable 61 (see the dashed line in FIG. 2), such that power can be supplied to each of the components from the power supply apparatus 60. To the power supply apparatus 60, DC24V power obtained by AC100V commercial electric power being rectified and converted by a not-illustrated rectifier circuit, is supplied, and DC24V power is further converted to DC18V, DC5V, and/or DC3.3V power in the power supply apparatus 60, to be supplied to each of the components. Hereinafter, for simplification of description, the main control portion 50, the image reading portion 10, the ADF 21, the image forming portion 22, and the operation display portion 24 are collectively referred to as a drive portion 45.

Structure of Power Supply Apparatus 60

Figure 3:
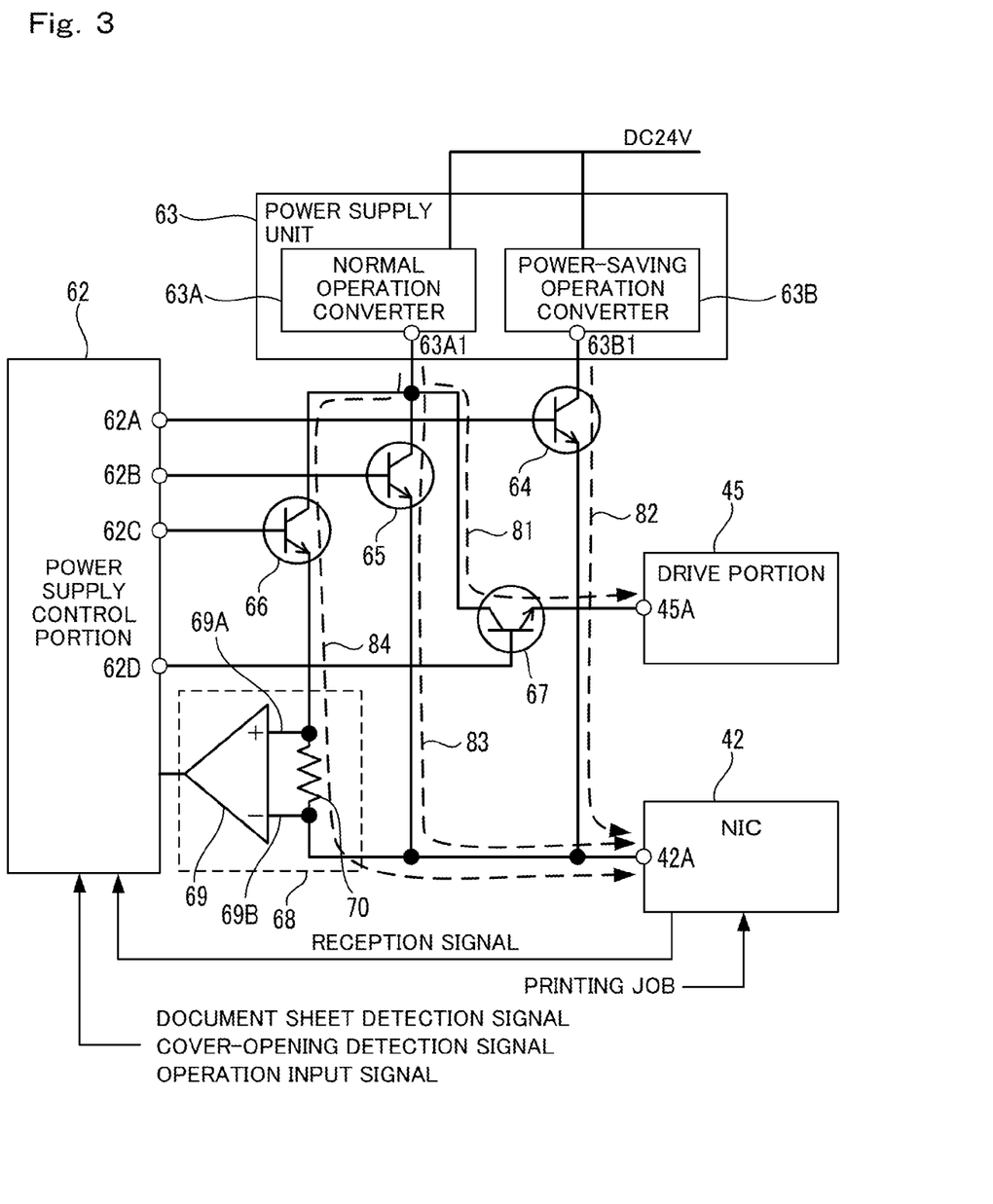
FIG. 3 schematically illustrates a structure of a power supply apparatus of the multifunction peripheral according to the embodiment of the present disclosure.

Next, a structure of the power supply apparatus 60 will be described in detail with reference to FIG. 3. As shown in FIG. 3, the power supply apparatus 60 includes the power supply control portion 62 (an example of a determination portion and supply control portion of the present disclosure), a power supply unit 63, four NPN transistors 64 to 67 typified by FETs (field-effect transistors), and a current detection circuit 68 (an example of a current detection portion of the present disclosure).

As shown in FIG. 3, the power supply unit 63 includes a normal operation converter (hereinafter, referred to as an "N-converter") 63A (an example of a first power supply of the present disclosure) and a power-saving operation converter (hereinafter, referred to as an "S-converter") 63B (an example of a second power supply of the present disclosure). DC24V power supplied externally to the power supply apparatus 60 is supplied to each of the N-converter 63A and the S-converter 63B. Each of the N-converter 63A and the S-converter 63B converts the supplied DC voltage (DC24V) to a predetermined voltage.

The N-converter 63A supplies power required for all the devices, such as the NIC 42 and the drive portion 45, corresponding to loads in the multifunction peripheral X, and the output current capacity of the N-converter 63A is set so as to have a value greater than a sum of a load current of the NIC 42 and a load current of the entirety of the drive portion 45. Specifically, the output current capacity of the N-converter 63A is set so as to have a value obtained by multiplying a maximum current consumption of the NIC 42 and the drive portion 45, by a predetermined factor of safety.

The S-converter 63B supplies power required for the NIC 42, and the output current capacity of the S-converter 63B is set so as to have a value greater than a load current of the NIC 42. Specifically, the output current capacity of the S-converter 63B is set so as to have a value obtained by multiplying a maximum current consumption of the NIC 42, by a predetermined factor of safety. The NIC 42 is prepared or produced so as to comply with the multifunction peripheral X by a manufacturer of the multifunction peripheral X. In the present embodiment, an output current capacity of the S-converter 63B is determined based on a load current of such an NIC 42, and the output current capacity of the S-converter 63B is not determined based on a load current of another compatible NIC that is connectable to the expansion slot for the NIC 42.

The N-converter 63A supplies power to not only the NIC 42 but also the drive portion 45, whereas the S-converter 63B supplies power to the NIC 42 only. Therefore, the output current capacity of the S-converter 63B is sufficiently less than the output current capacity of the N-converter 63A.

The power supply control portion 62 is structured as a control board in which a microcomputer including, as main components, a CPU, a ROM, a RAM, and an EEPROM is mounted. Further, in the power supply control portion 62, not-illustrated control devices such as an internal timer are also mounted. The power supply control portion 62 performs an operation mode switching control as described below according to process steps indicated in a flow chart of FIG. 4 by the CPU executing a predetermined control program stored in the ROM. The power supply control portion 62 may be structured as an electronic circuit such as an integrated circuit (ASIC, DSP).

The power supply control portion 62 controls supply of power from the power supply unit 63 to the NIC 42 or the drive portion 45. Specifically, the power supply control portion 62 performs control for switching an operation mode of the multifunction peripheral X between the normal operation mode and the power-saving operation mode. The normal operation mode represents an operation mode in which power is supplied from the N-converter 63A to the NIC 42 and the drive portion 45 to operate the NIC 42 and the drive portion 45. On the other hand, the power-saving operation mode represents an operation mode in which power is supplied to only the NIC 42 from one of the N-converter 63A or the S-converter 63B to operate the NIC 42. In the power-saving operation mode, power-saving effect is higher than that of the normal operation mode. In the present embodiment, the power-saving operation mode includes two kinds of modes, that is, a first power-saving mode and a second power-saving mode. The former mode, that is, the first power-saving mode represents an operation mode in which power is supplied to only the NIC 42 from the S-converter 63B to operate the NIC 42, and the latter mode, that is, the second power-saving mode represents an operation mode in which power is supplied to only the NIC 42 from the N-converter 63A to operate the NIC 42. Hereinafter, the first power-saving mode and the second power-saving mode are collectively referred to as a power-saving mode. These operation modes will be described below.

When the multifunction peripheral X operates in the normal operation mode, power is constantly supplied to the NIC 42 and the drive portion 45. Therefore, when a printing job or a document sheet reading instruction is inputted, the image forming process or the image reading process is immediately executed. On the other hand, in a case where the multifunction peripheral X operates in the power-saving operation mode, after a printing job or a document sheet reading instruction is inputted, power is supplied to the drive portion 45. Therefore, a waiting time period in which the fixing roller 37 of the image forming portion 22 reaches a predetermined temperature, or in which a brightness of the LED light source 121 of the reading unit 12 becomes stable, is required. After elapse of the waiting time period, the image forming process or the image reading process is executed.

The current detection circuit 68 measures current consumption of the NIC 42 that is operating, and includes a current detection amplifier (current detector) 69 and a shunt resistor 70. The shunt resistor 70 is connected between two input terminals 69A and 69B of the current detection amplifier 69. Further, a minus-side terminal 69B of the current detection amplifier is connected to an input terminal 42A of the NIC 42, and a plus-side terminal 69A of the current detection amplifier is connected to an emitter of the transistor 66. The current detection amplifier 69 performs differential amplification for a voltage of a current that flows through the shunt resistor 70, to output the result as a voltage signal to the power supply control portion 62.

The transistor 67 (an example of a first switch circuit of the present disclosure) causes a power supply path 81 (an example of a first power supply path of the present disclosure, see the dashed line in FIG. 3) to be conductive or non-conductive, and the power supply path 81 is used for supplying power from the N-converter 63A to the drive portion 45. A collector of the transistor 67 is connected to an output terminal 63A1 of the N-converter 63A, an emitter of the transistor 67 is connected to an input terminal 45A of the drive portion 45, and a base of the transistor 67 is connected to a signal output terminal 62D of the power supply control portion 62. When a HIGH level control signal is outputted through the signal output terminal 62D by the power supply control portion 62, the signal is inputted to the base of the transistor 67 to connect between the collector and the emitter of the transistor 67. Thus, power is supplied from the N-converter 63A to the drive portion 45. On the other hand, when input of the control signal through the signal output terminal 62D ends, the collector and the emitter of the transistor 67 are disconnected from each other. Thus, supply of power from the N-converter 63A to the drive portion 45 is stopped.

The transistor 64 (an example of a second switch circuit of the present disclosure) causes a power supply path 82 (an example of a second power supply path of the present disclosure, see the dashed line in FIG. 3) to be conductive or non-conductive, and the power supply path 82 is used for supplying power from the S-converter 63B to the NIC 42. A collector of the transistor 64 is connected to an output terminal 63B1 of the S-converter 63B, an emitter of the transistor 64 is connected to the input terminal 42A of the NIC 42, and a base of the transistor 64 is connected to a signal output terminal 62A of the power supply control portion 62. When a HIGH level control signal is outputted through the signal output terminal 62A by the power supply control portion 62, the signal is inputted to the base of the transistor 64 to connect between the collector and the emitter of the transistor 64. Thus, power is supplied from the S-converter 63B to the NIC 42. On the other hand, when input of the control signal through the signal output terminal 62A ends, the collector and the emitter of the transistor 64 are disconnected from each other. Thus, supply of power from the S-converter 63B to the NIC 42 is stopped.

The transistor 65 (an example of a third switch circuit of the present disclosure) causes a power supply path 83 (an example of a third power supply path of the present disclosure, see the dashed line in FIG. 3) to be conductive or non-conductive, and the power supply path 83 is used for supplying power from the N-converter 63A to the NIC 42. A collector of the transistor 65 is connected to the output terminal 63A1 of the N-converter 63A, an emitter of the transistor 65 is connected to the input terminal 42A of the NIC 42, and a base of the transistor 65 is connected to a signal output terminal 62B of the power supply control portion 62. When a HIGH level control signal is outputted through the signal output terminal 62B by the power supply control portion 62, the signal is inputted to the base of the transistor 65 to connect between the collector and the emitter of the transistor 65. Thus, power is supplied from the N-converter 63A to the NIC 42. On the other hand, when input of the control signal through the signal output terminal 62B ends, the collector and the emitter of the transistor 65 are disconnected from each other. Thus, supply of power from the N-converter 63A to the NIC 42 is stopped.

The transistor 66 causes a power supply path 84 (see the dashed line in FIG. 3) to be conductive or non-conductive, and the power supply path 84 is used for supplying power from the N-converter 63A to the current detection circuit 68 and the NIC 42. A collector of the transistor 66 is connected to the output terminal 63A1 of the N-converter 63A, an emitter of the transistor 66 is connected to one end of the shunt resistor 70 in the current detection circuit 68, and a base of the transistor 66 is connected to a signal output terminal 62C of the power supply control portion 62. The other end of the shunt resistor 70 is connected to the input terminal 42A of the NIC 42. When a HIGH level control signal is outputted through the signal output terminal 62C by the power supply control portion 62, the signal is inputted to the base of the transistor 66 to connect between the collector and the emitter of the transistor 66. Thus, power is supplied from the N-converter 63A to the NIC 42, and current flows through the shunt resistor 70. On the other hand, when input of the control signal through the signal output terminal 62C ends, the collector and the emitter of the transistor 66 are disconnected from each other. Thus, supply of power from the N-converter 63A to the NIC 42 and the current detection circuit 68 is stopped.

Figure 4:
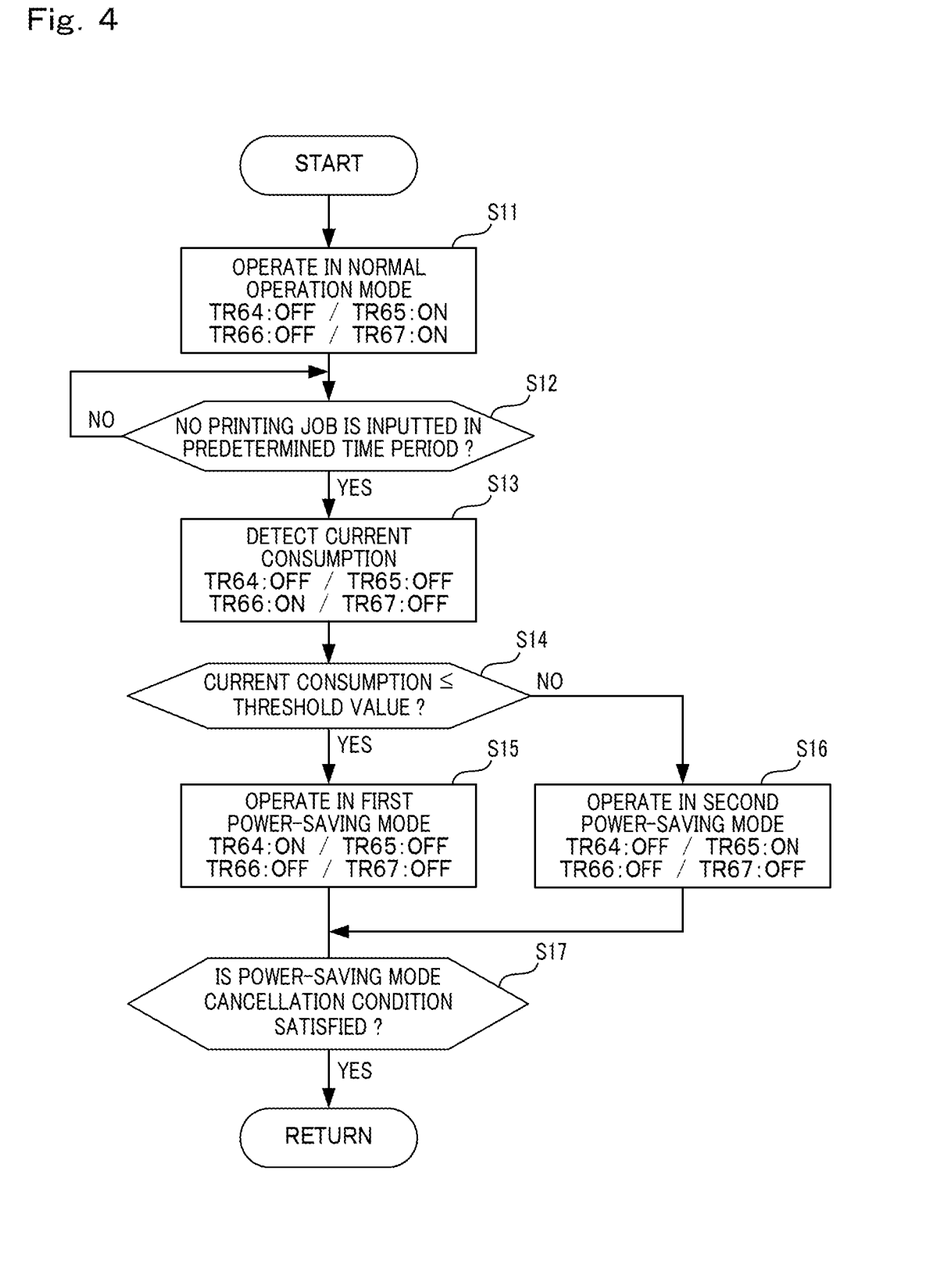
FIG. 4 is a flow chart illustrating an example of an operation mode switching control process steps executed by a power supply control portion of the power supply apparatus shown in FIG. 3.
Figure 5:
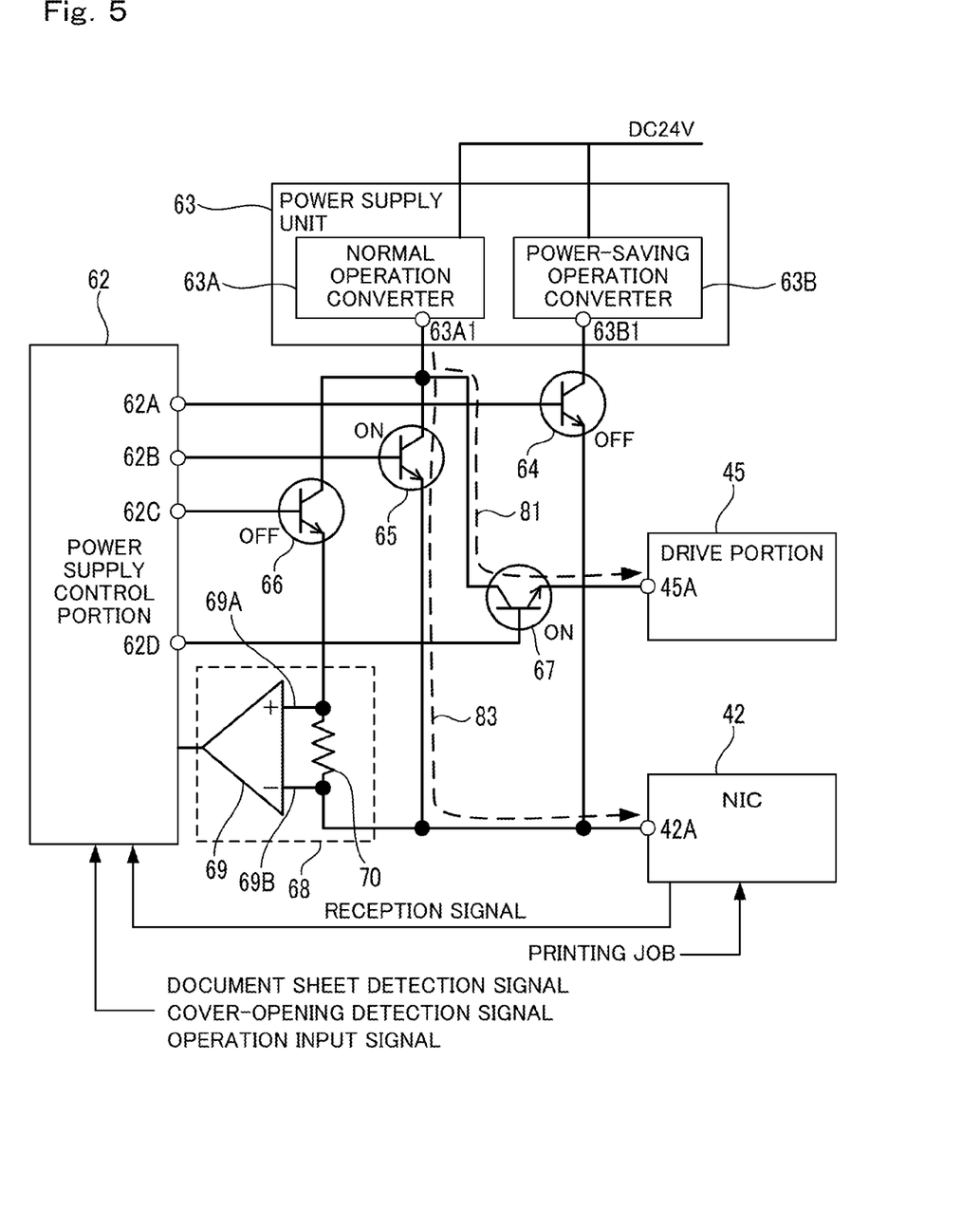
FIG. 5 schematically illustrates a structure of the power supply apparatus, shown in FIG. 3, which is in an operating state.
Figure 6:
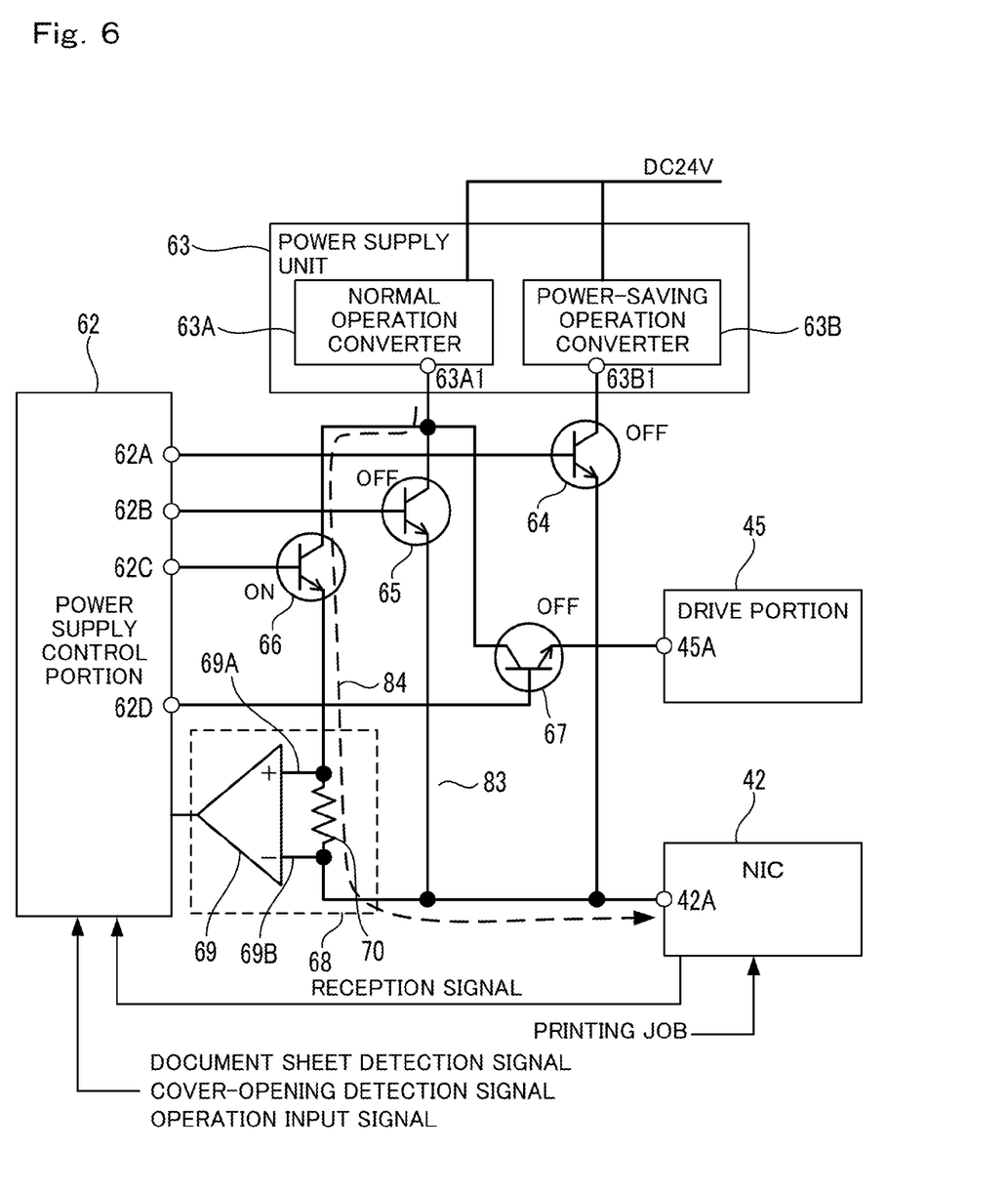
FIG. 6 schematically illustrates a structure of the power supply apparatus, shown in FIG. 3, which is in an operating state.
Figure 7:
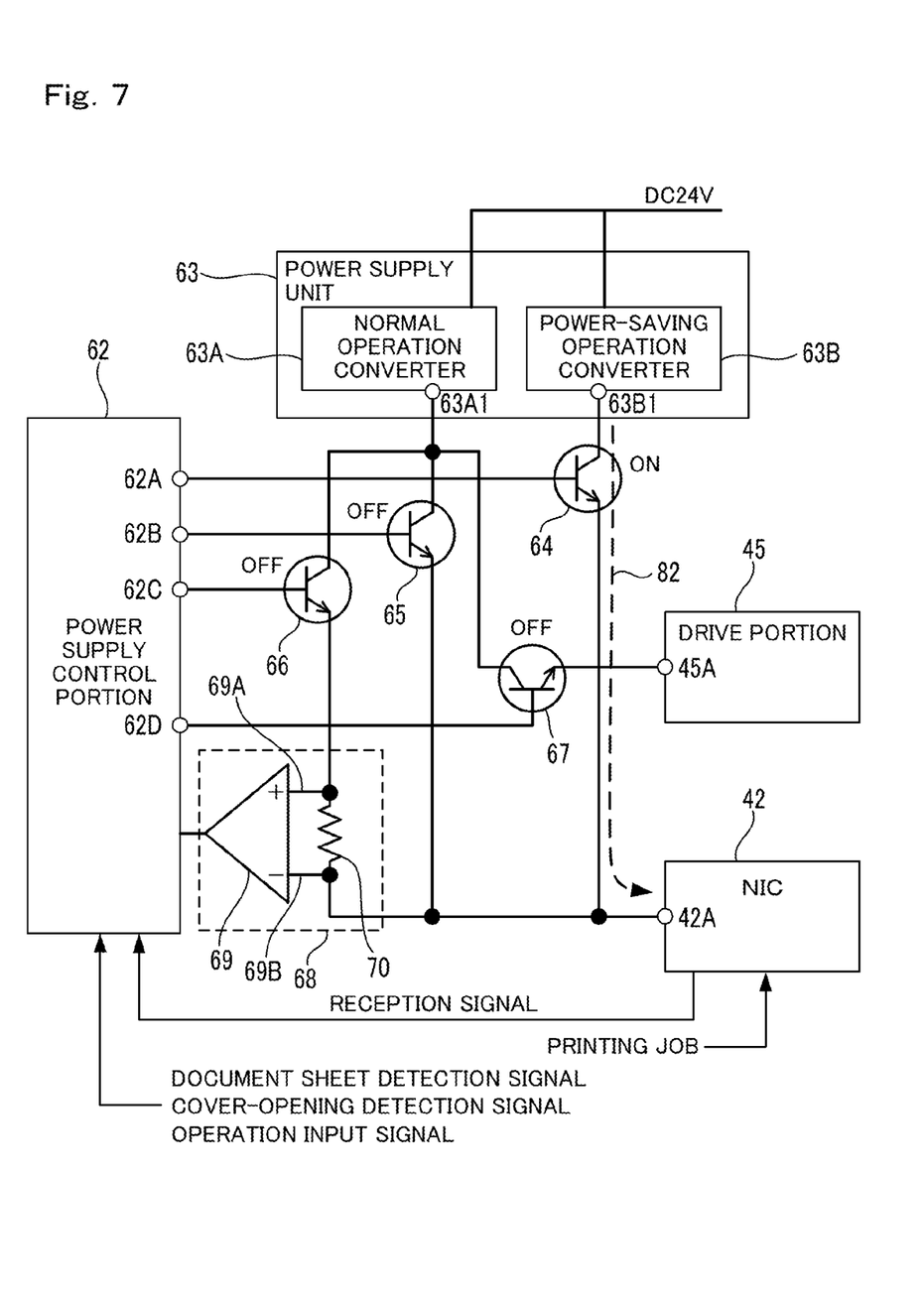
FIG. 7 schematically illustrates a structure of the power supply apparatus, shown in FIG. 3, which is in an operating state.
Figure 8:
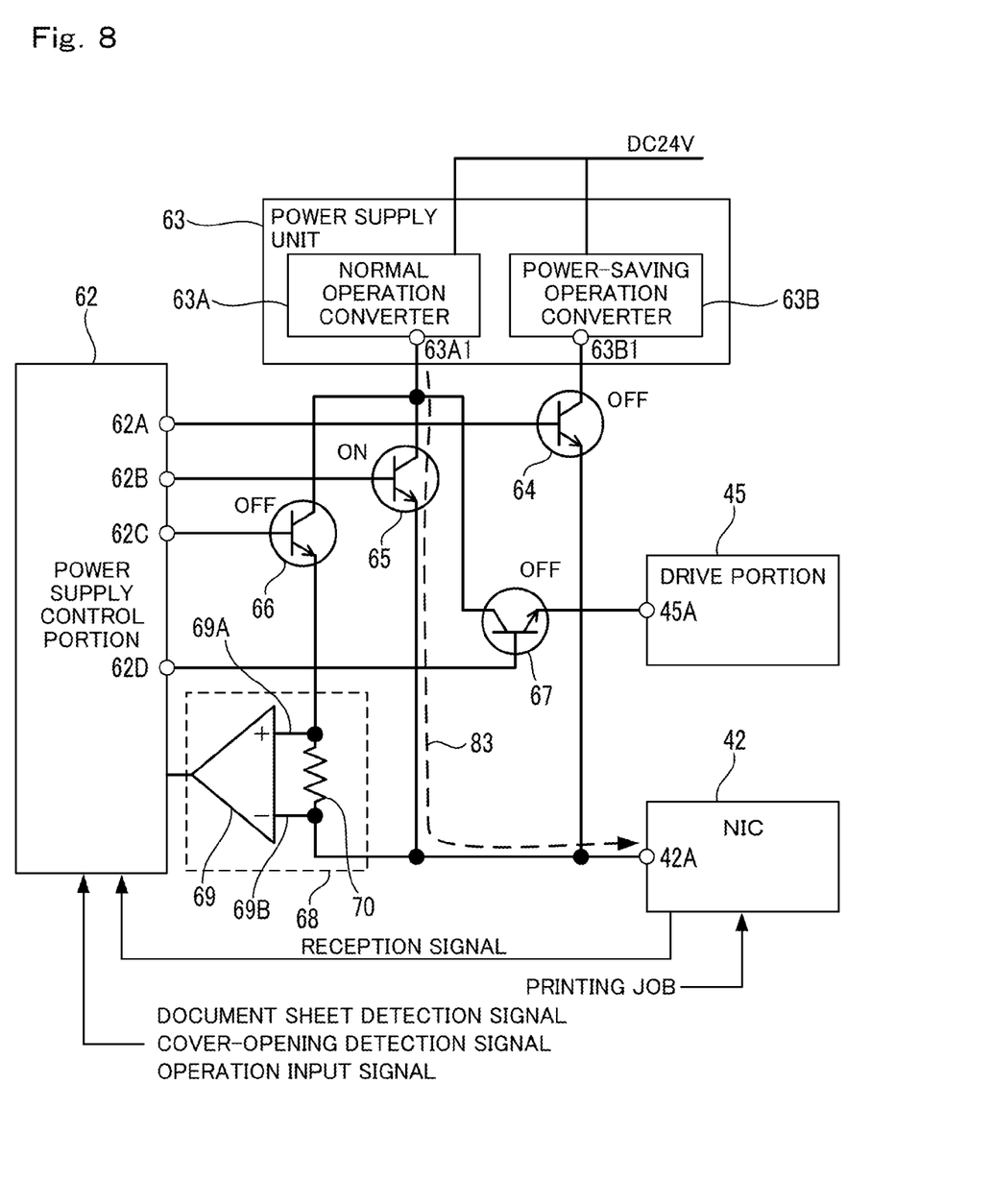
FIG. 8 schematically illustrates a structure of the power supply apparatus, shown in FIG. 3, which is in an operating state.

Next, exemplary process steps of the operation mode switching control executed by the power supply control portion 62 will be described with reference to the flow chart of FIG. 4 and schematic diagrams of FIGS. 5 to 8. In FIG. 4, S11, S12, . . . represent process procedure (step) numbers. Further, in FIG. 4, reference character TR represents a transistor. When each process step is executed according to the process procedure by the power supply control portion 62, the determination portion and the supply control portion of the present disclosure are implemented by the power supply control portion 62. FIG. 5 shows a state where the power supply apparatus 60 operates in the normal operation mode. FIG. 6 shows a state where the power supply apparatus 60 operates so as to detect current. FIG. 7 shows a state where the power supply apparatus 60 operates in the first power-saving mode. FIG. 8 shows a state where the power supply apparatus 60 operates in the second power-saving mode.

(Step S11)

Firstly, when a main power supply of the multifunction peripheral X is turned on, the power supply control portion 62 causes the multifunction peripheral X to operate in the normal operation mode. Specifically, as shown in FIG. 5, the power supply control portion 62 outputs a control signal to the base of each of the transistor 65 and the transistor 67, to operate the transistor 65 and the transistor 67. The transistors 64 and 66 are not operated. Thus, power is supplied from the N-converter 63A through the power supply path 83 to the NIC 42, and power is also supplied from the N-converter 63A through the power supply path 81 to the drive portion 45.

(Step S12)

In step S12, the power supply control portion 62 determines whether or not a printing job is inputted in a predetermined time period when the multifunction peripheral X is operating in the normal operation mode. Specifically, when a printing job transmitted from an external information processing apparatus such as a personal computer via a network is received by the NIC 42, the reception signal associated therewith is outputted from the NIC 42 to the power supply control portion 62, and the power supply control portion 62 actuates an internal timer when the reception signal is received, to measure time until elapse of the predetermined time period. When it is determined in step S12 that the printing job is inputted in the predetermined time period, the operation is continued in the normal operation mode. On the other hand, when it is determined in step S12 that no printing job is inputted in the predetermined time period, the process is advanced to the subsequent step S13.

(Step S13)

In step S13, the power supply control portion 62 performs a process for detecting power consumption of the NIC 42 that is operating. Specifically, as shown in FIG. 6, the power supply control portion 62 stops outputting the control signal to the transistor 65 and the transistor 67, and outputs a control signal to the base of the transistor 66, to operate the transistor 66. The transistor 64 is not operated. Thus, current flows from the N-converter 63A through the power supply path 84 into the NIC 42 and the shunt resistor 70. At this time, the current detection amplifier 69 performs differential amplification for voltages at both ends of the shunt resistor 70 to output a voltage signal to the power supply control portion 62. The power supply control portion 62 calculates current consumption of the NIC 42 according to the voltage signal and an internal resistance of the current detection amplifier 69. A value of the calculated current consumption is temporarily stored in, for example, the RAM of the power supply control portion 62. Thereafter, the process is advanced to step S14.

(Steps S14 to S16)

In step S14, the power supply control portion 62 performs a process of comparing the current consumption measured in step S13, with a predetermined threshold value. In the present embodiment, the threshold value is set as the same value as the output current capacity of the S-converter 63B. Namely, in step S14, the current consumption measured in step S13 and the output current capacity of the S-converter 63B are compared with each other. When it is determined in step S14 that the current consumption indicates a value that is less than or equal to the threshold value, namely, that the current consumption indicates a value that is less than or equal to the output current capacity of the S-converter 63B, the NIC 42 can be operated by the S-converter 63B. Therefore, the process is advanced to the subsequent step S15, and the multifunction peripheral X is operated in the first power-saving mode. Specifically, as shown in FIG. 7, the power supply control portion 62 stops outputting the control signal to the transistor 66, and outputs a control signal to the base of the transistor 64, to operate the transistor 64. The transistors 65 and 67 are not operated. Thus, power is supplied only to the NIC 42 from the S-converter 63B through the power supply path 82.

On the other hand, when it is determined in step S14 that the current consumption indicates a value greater than the threshold value, that is, that the current consumption indicates a value greater than the output current capacity of the S-converter 63B, power from the S-converter 63B is insufficient for operating the NIC 42. Therefore, the process is advanced to the subsequent step S16, and the multifunction peripheral X is operated in the second power-saving mode. Specifically, as shown in FIG. 8, the power supply control portion 62 stops outputting the control signal to the transistor 66, and outputs a control signal to the base of the transistor 65, to operate the transistor 65. The transistors 64 and 67 are not operated. Thus, power is supplied only to the NIC 42 through the power supply path 83 from the N-converter 63A having an output current capacity that is higher than the S-converter 63B.

(Step S17)

When the process step of step S15 or step S16 ends, the power supply control portion 62 determines, in the subsequent step S17, whether or not a cancellation condition for cancelling the power-saving mode and shifting to the normal operation mode is satisfied. Specifically, in a case where a printing job is inputted from an external information processing apparatus and the power supply control portion 62 receives a reception signal outputted from the NIC 42, the power supply control portion 62 determines that the cancellation condition is satisfied. Further, the power supply control portion 62 may determine that the cancelation condition is satisfied, for example, when receiving a document sheet detection signal outputted when a document sheet is set on the document sheet set portion 21A of the ADF 21, when receiving a cover-opening detection signal outputted when the document sheet cover 20 is opened, or when receiving an operation input signal outputted from the operation display portion 24. Thus, when the cancellation condition is determined as being satisfied, the power supply control portion 62 returns the process to step S11 to operate the multifunction peripheral X in the normal operation mode.

As described above, since the multifunction peripheral X of the present embodiment is provided with the power supply apparatus 60 described above, when a condition for shifting from the normal operation mode to the power saving mode is satisfied, the power supply control portion 62 measures current consumption of the NIC 42 mounted to the multifunction peripheral X, and determines, by comparison, whether or not the current consumption indicates a value that is less than or equal to the output current capacity of the S-converter 63B. When the current consumption indicates a value that is less than or equal to the output current capacity of the S-converter 63B, the multifunction peripheral X shifts to the first power-saving mode in which power is supplied only to the NIC 42 from the S-converter 63B, and the multifunction peripheral X operates in the first power-saving mode. In the first power-saving mode, a ratio of the current consumption of the NIC 42 to the output current capacity of the S-converter 63B is extremely high. Therefore, since power conversion efficiency is high when the S-converter 63B is used, the current consumption can be further reduced with the use of the S-converter 63B. As a result, power saving effect can be enhanced with the use of the power supply apparatus 60 and the multifunction peripheral X.

Further, even when a plurality of multifunction peripherals X of the same type are produced, load current varies among the NICs 42 mounted to the multifunction peripherals X, respectively. In the present embodiment, if the current consumption of a certain NIC 42 exceeds the output current capacity of the S-converter 63B due to the variation in load current, when the condition for shifting to the power saving mode is satisfied, the multifunction peripheral X shifts to the second power-saving mode in which power is supplied only to the NIC 42 from the N-converter 63A, and the multifunction peripheral X operates in the second power-saving mode.

Therefore, supply of power from the S-converter 63B to the NIC 42 in a state where power is insufficient is avoided, whereby malfunction, such as malfunction of the NIC 42 or occurrence of failure in the S-converter 63B, caused by insufficient power, can be prevented.

Further, also in a case where, instead of the NIC 42 mounted to the multifunction peripheral X, another compatible general-purpose NIC is mounted in the expansion slot of the multifunction peripheral X, when the condition for shifting from the normal operation mode to the power saving mode is satisfied, the current consumption of the NIC is measured. In the same manner as described above, in a case where the current consumption indicates a value that is less than or equal to the output current capacity of the S-converter 63B, the multifunction peripheral X shifts to the first power-saving mode. Similarly, in a case where the current consumption indicates a value greater than the output current capacity of the S-converter 63B, the multifunction peripheral X shifts to the second power-saving mode. Therefore, also when the other NIC having an unknown current consumption is mounted, the multifunction peripheral X can shift to an optimal power saving mode.

In the above-described embodiment, an exemplary case is described where the document sheet detection signal, the cover-opening detection signal, or the operation input signal is inputted to the power supply control portion 62. However, all of the signals may be inputted to the NIC 42, and, when the NIC 42 receives one of the signals, the NIC 42 may output, to the power supply control portion 62, the reception signal for the received signal.

In the above-described embodiment, an exemplary case is described where a transistor is used as a switch circuit of the present disclosure. However, a device such as a mechanical switch may be used instead of the transistor.

Further, in the above-described embodiment, an exemplary case is described where, when the multifunction peripheral X operates in the power saving mode (the first power-saving mode and the second power-saving mode), power is supplied only to the NIC 42. However, in a case where, for example, power needs to be constantly supplied to another component as well as the NIC 42, power may be supplied to the other component as well as the NIC 42. For example, in a case where power needs to be constantly supplied to the operation display portion 24 in order to electrically detect an operation input to the operation display portion 24, power may be supplied to both the NIC 42 and the operation display portion 24. In this case, a current detection circuit 68 that can detect current consumption of both of the NIC 42 and the operation display portion 24 may be used, or the current detection circuits 68 may be individually provided in the NIC 42 and the operation display portion 24, respectively.

Further, in the above-described embodiment, the NIC 42 is described as an example of the first load of the present disclosure. However, for a multifunction peripheral which does not use the NIC 42, a component to which power needs to be constantly supplied corresponds to the first load of the present disclosure. For example, in a case where an operation input to the operation display portion 24 needs to be electrically detected in order to determine whether or not a condition for return from the power saving mode to the normal operation mode is satisfied, power needs to be constantly supplied to the operation display portion 24. In this case, the operation display portion 24 corresponds to the first load of the present disclosure.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A power supply apparatus that switches between a normal operation mode in which power is supplied to a plurality of loads including a first load and a power saving mode in which power is supplied to a part of the loads including at least the first load, to supply power to the loads, the power supply apparatus comprising:
a first power supply configured to supply power to the plurality of loads;
a second power supply having an output current capacity which is less than that of the first power supply;
a current detection portion configured to detect current consumption of the first load that is operating;
a determination portion configured to determine whether or not the current consumption detected by the current detection portion is less than or equal to the output current capacity of the second power supply; and
a supply control portion configured to supply, based on a result of determination made by the determination portion, power to the first load from one of the first power supply and the second power supply in the power saving mode.

2. The power supply apparatus according to claim 1, wherein
when the current consumption detected by the current detection portion is determined as being less than or equal to the output current capacity of the second power supply, the supply control portion operates to supply power to the first load from the second power supply, and
when the current consumption detected by the current detection portion is determined as being greater than the output current capacity of the second power supply, the supply control portion operates to supply power to the first load from the first power supply.

3. The power supply apparatus according to claim 1, wherein, when a switching condition for switching from the normal operation mode to the power saving mode is satisfied, the determination portion determines whether or not the current consumption detected by the current detection portion is less than or equal to the output current capacity of the second power supply.

4. The power supply apparatus according to claim 1, wherein the first load is an input reception portion that receives input of a signal representing an operation instruction issued to the loads other than the first load.

5. The power supply apparatus according to claim 1, further comprising:
a first power supply path through which power is supplied from the first power supply to the loads other than the first load;
a first switch circuit configured to cause the first power supply path to be conductive or non-conductive;
a second power supply path through which power is supplied from the second power supply to the first load;
a second switch circuit configured to cause the second power supply path to be conductive or non-conductive;
a third power supply path through which power is supplied from the first power supply to the first load; and
a third switch circuit configured to cause the third power supply path to be conductive or non-conductive, wherein
when the current consumption detected by the current detection portion is determined as being less than or equal to the output current capacity of the second power supply, the supply control portion performs switching control such that the first switch circuit causes the first power supply path to be non-conductive, the second switch circuit causes the second power supply path to be conductive, and the third switch circuit causes the third power supply path to be non-conductive, and when the current consumption detected by the current detection portion is determined as being greater than the output current capacity of the second power supply, the supply control portion performs switching control such that the first switch circuit causes the first power supply path to be non-conductive, the second switch circuit causes the second power supply path to be non-conductive, and the third switch circuit causes the third power supply path to be conductive.

6. An image forming apparatus comprising:
a power supply apparatus configured to switch between a normal operation mode in which power is supplied to a plurality of loads including a first load and a power saving mode in which power is supplied to a part of the loads including at least the first load, to supply power to the loads;
an image forming portion, provided as one of the loads other than the first load, configured to perform image formation on a recording medium; and
an input reception portion, provided as the first load, configured to receive input of a signal representing a print instruction issued to the image forming portion, wherein the power supply apparatus includes:
a first power supply configured to supply power to the plurality of loads;
a second power supply having an output current capacity which is less than that of the first power supply;
a current detection portion configured to detect current consumption of the first load that is operating;
a determination portion configured to determine whether or not the current consumption detected by the current detection portion is less than or equal to the output current capacity of the second power supply; and
a supply control portion configured to supply, based on a result of determination made by the determination portion, power to the first load from one of the first power supply and the second power supply in the power saving mode.

7. The image forming apparatus according to claim 6, wherein
when the current consumption detected by the current detection portion is determined as being less than or equal to the output current capacity of the second power supply, the supply control portion operates to supply power to the first load from the second power supply, and when the current consumption detected by the current detection portion is determined as being greater than the output current capacity of the second power supply, the supply control portion operates to supply power to the first load from the first power supply.

8. The image forming apparatus according to claim 6, wherein, when a switching condition for switching from the normal operation mode to the power saving mode is satisfied, the determination portion determines whether or not the current consumption detected by the current detection portion is less than or equal to the output current capacity of the second power supply.

9. The image forming apparatus according to claim 6, wherein the first load is an input reception portion that receives input of a signal representing an operation instruction issued to the loads other than the first load.

10. The image forming apparatus according to claim 6, further comprising:
a first power supply path through which power is supplied from the first power supply to the loads other than the first load;
a first switch circuit configured to cause the first power supply path to be conductive or non-conductive;
a second power supply path through which power is supplied from the second power supply to the first load;
a second switch circuit configured to cause the second power supply path to be conductive or non-conductive;
a third power supply path through which power is supplied from the first power supply to the first load; and
a third switch circuit configured to cause the third power supply path to be conductive or non-conductive, wherein
when the current consumption detected by the current detection portion is determined as being less than or equal to the output current capacity of the second power supply, the supply control portion performs switching control such that the first switch circuit causes the first power supply path to be non-conductive, the second switch circuit causes the second power supply path to be conductive, and the third switch circuit causes the third power supply path to be non-conductive, and
when the current consumption detected by the current detection portion is determined as being greater than the output current capacity of the second power supply, the supply control portion performs switching control such that the first switch circuit causes the first power supply path to be non-conductive, the second switch circuit causes the second power supply path to be non-conductive, and the third switch circuit causes the third power supply path to be conductive.

* * * * *